United States Patent [19]

Zheng

[11] Patent Number: 5,392,280
[45] Date of Patent: Feb. 21, 1995

[54] DATA TRANSMISSION SYSTEM AND SCHEDULING PROTOCOL FOR CONNECTION-ORIENTED PACKET OR CELL SWITCHING NETWORKS

[75] Inventor: Oin Zheng, Belmont, Mass.

[73] Assignee: Mitsubishi Electric Research Laboratories, Inc., Cambridge, Mass.

[21] Appl. No.: 224,671

[22] Filed: Apr. 7, 1994

[51] Int. Cl.6 .............................................. H04L 12/56
[52] U.S. Cl. ..................................... 370/60; 370/94.2; 370/95.1
[58] Field of Search ..................... 370/60, 60.1, 94.1, 370/61, 110.1, 108, 85.1, 85.15, 95.1–95.3, 79, 81, 111, 118; 340/825.05, 825.5, 825.51

[56] References Cited

U.S. PATENT DOCUMENTS

| | | | |
|---|---|---|---|
| 4,587,650 | 5/1986 | Bell | 370/85.15 |
| 4,637,014 | 1/1987 | Bell et al. | 370/85.15 |
| 4,763,321 | 8/1988 | Calvignac et al. | 370/85.1 |
| 4,914,650 | 4/1990 | Sriram | 370/60 |

Primary Examiner—Douglas W. Olms
Assistant Examiner—Ajit Patel
Attorney, Agent, or Firm—Robert K. Tendler

[57] ABSTRACT

In connection-oriented packet or cell switching networks, a data transmission system and scheduling protocol utilizes both synchronous transmission and asynchronous transmission in an alternating pattern to provide each user with both a guaranteed transmission bandwidth or capacity to accommodate real-time communications, and bandwidth sharing among users to increase network utilization, while simultaneously eliminating network congestion to avoid data losses. The synchronous time slots provide for the bandwidth guarantees, while the asynchronous time slots are used to transmit data when a part of a previous synchronous time slot is not used. The asynchronous time slots also permit asynchronous data transmission using unallocated time within a given time frame. In one embodiment, time frames for data transmission are provided in which each time frame is composed of synchronous transmission times interspersed with asynchronous transmission times. For a given time frame, alternating synchronous and asynchronous transmission times are specified by a controller which determines the pattern of this alternation. In a preferred embodiment, the pattern is altered using novel timed-round-robin scheduling which transmits cells of data of respective connections over an outgoing link depending upon the synchronous transmission time allocated to each connection. To avoid data losses, asynchronous transmission is permitted only when a downstream switch indicates sufficient buffer space to accommodate asynchronous transmission from an upstream switch.

8 Claims, 16 Drawing Sheets

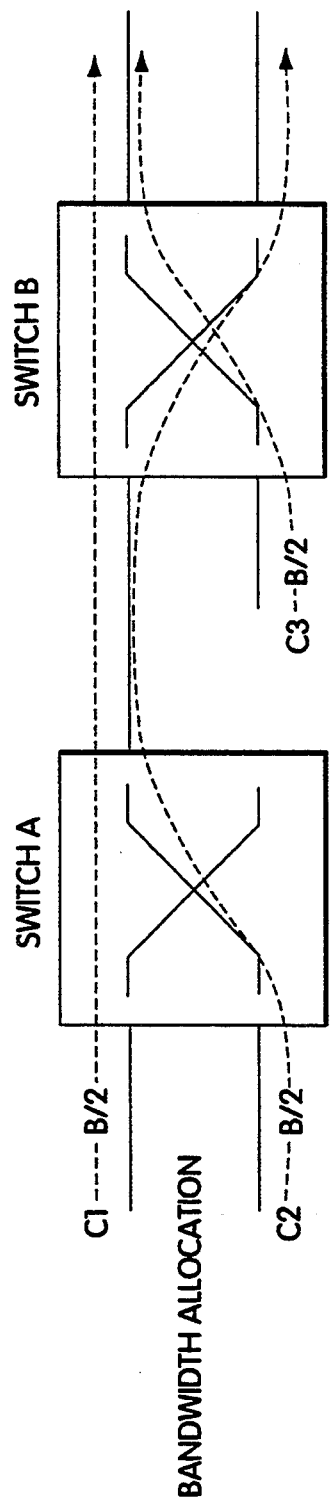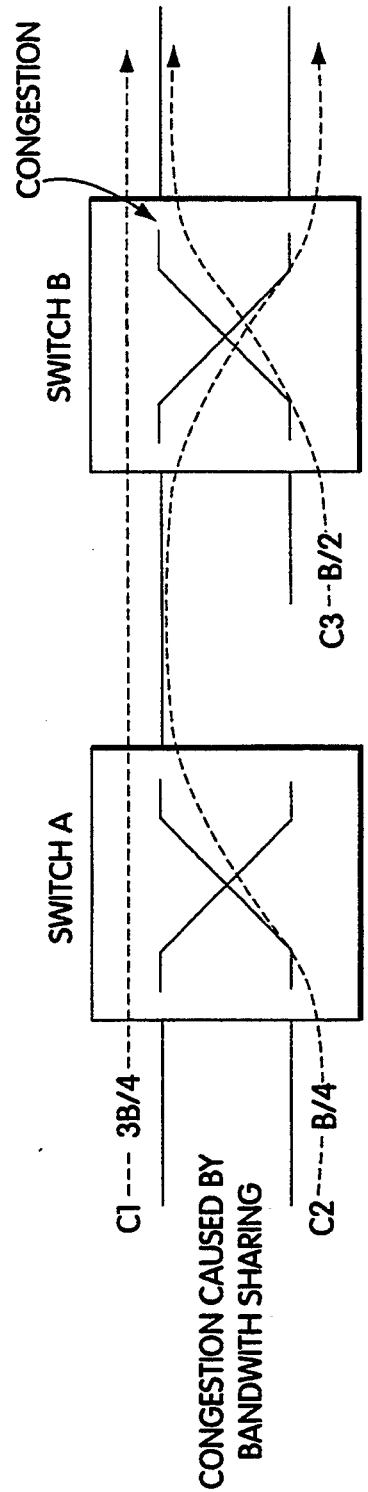

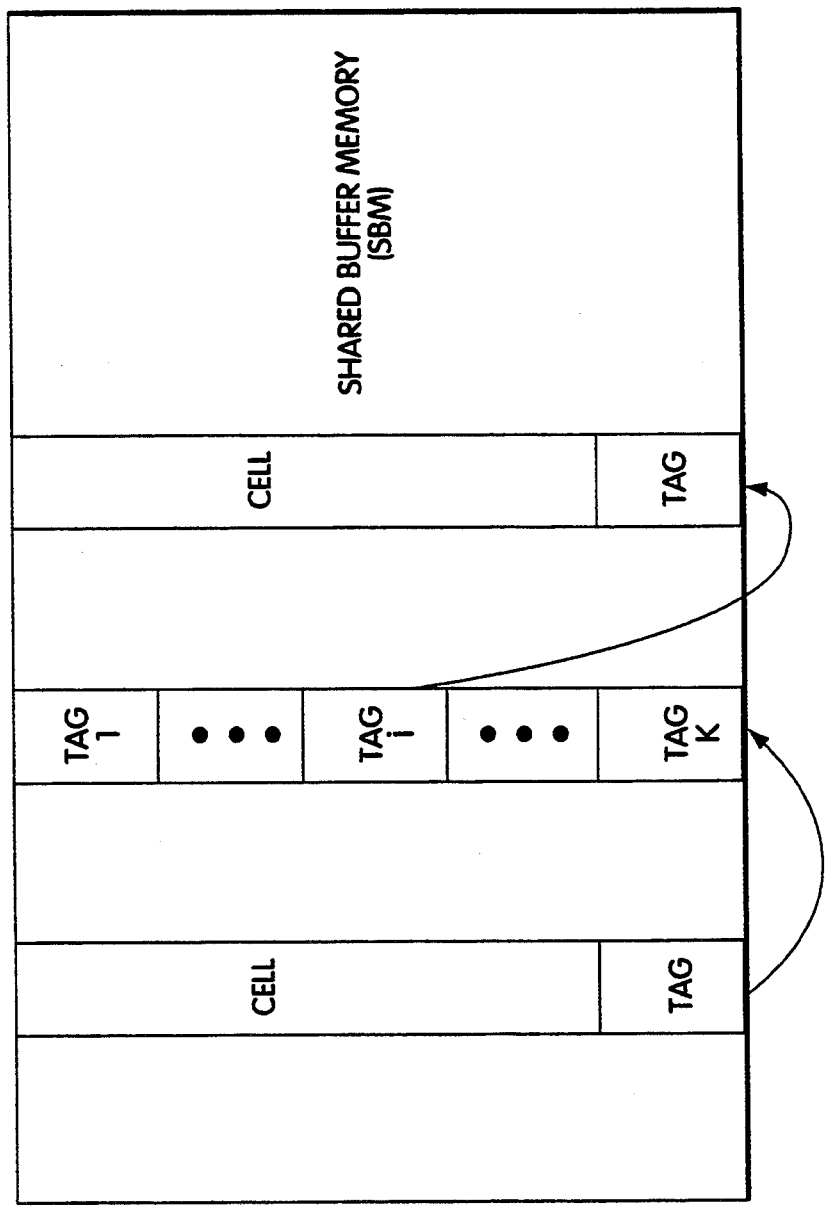

DATA TRANSMISSION SYSTEM AND SCHEDULING PROTOCOL FOR CONNECTION-ORIENTED PACKET OR CELL SWITCHING NETWORKS

FIELD OF THE INVENTION

This invention relates to digital communication networks, and more particularly to a system for both guaranteeing transmission capacities to users and maximizing network usage by providing a novel data transmission scheduling and feedback flow control system.

BACKGROUND OF THE INVENTION

Digital communication networks can be classified into two types: synchronous and asynchronous networks. In a synchronous network, communication capacity is statically allocated to users by dividing time into fixed size frames and assigning a portion of each frame to an individual user. In an asynchronous network, information is organized into self-contained data units called packets or cells. Each data unit is transferred over a network independently without being controlled by time frames.

The advantage of a synchronous network is that each user is allocated a given communication capacity such that a certain type of quality of service, e.g., transmission bandwidth and delay bounds, can be guaranteed. However, a synchronous network is inefficient in transporting variable bit-rate traffic since communication resources can not be shared among users. Today's digital telephone network is one example of a synchronous network which supports real-time voice conversation relatively well but exhibits low efficiency when used for bursty computer data transmissions in which large amounts of data are transmitted in a burst.

Asynchronous networks, on the other hand, can achieve high network utilization by statistically multiplexing variable bit-rate traffic on a transmission link, but with a loss of quality of service guarantees for users. While present computer networks offer an example of how an asynchronous network supports computer data communication, asynchronous networks oftentimes cannot support real-time audio/video communications satisfactorily.

Asynchronous Transfer Mode or ATM technology is an emerging technology which tries to achieve the advantages of both synchronous and asynchronous networks. Specifically, ATM networks organize a user's information into 53-byte fixed-size cells which are asynchronously transferred along a pre-established path without being subject to constraints of time frames. Since transmission bandwidth is dynamically shared by all users, high network utilization can be achieved. But ATM networks inherit a common problem of asynchronous transmission: namely the lack of quality of service guarantees. It is difficult to control the amount of traffic transferred over an ATM network such that quality of service can be guaranteed while maintaining a high level of network usage. Although many traffic control schemes have been proposed to overcome this problem, no one has succeeded in making ATM capable of possessing advantages of both synchronous and asynchronous transmissions simultaneously.

Specifically, investigators have tried to solve the traffic control problem with two approaches: preventive control and reactive control. Preventive control tries to prevent a network from reaching an unacceptable level of congestion. A common approach is to control traffic flow at entry points of a network with admission control and bandwidth enforcement. For ATM switches, admission control determines whether or not to accept a new connection at the connection setup time. Bandwidth enforcement monitors each individual connection to ensure that the actual traffic flow conforms to that specified at the time of connection setup. With the use of a proper cell transmission scheduling policy at switches, preventive control can often provide users with a certain type of quality of service, ranging from a guaranteed bandwidth to delay bounds. But a major problem with preventive control is that it is difficult to achieve high network utilization for variable bit-rate traffic, e.g., traffic of widely differing bit rates. A user is usually not allowed to send more messages than specified, even when a network load condition allows this to happen. This makes ATM networks behave like synchronous networks. Also, many traffic policing and scheduling schemes are costly to implement.

Reactive control, on the other hand, admits traffic according to the current network load condition with a feedback mechanism. A network can accept traffic on a best effort basis and there is no pre-set limit on the amount of traffic that each connection can carry. Thus it is possible to achieve high degree of dynamic bandwidth sharing and a high network utilization, making reactive control suitable for bursty data traffics like those exhibited in computer networks. However, with reactive control, it is difficult to provide quality of service guarantees since the bandwidth that each connection can use depends on the actual network load condition. Like asynchronous transmission, a lack of quality of service guarantee makes reactive control incapable of supporting real-time applications requiring guaranteed bandwidth such as interactive audio/video transmissions.

In the view of the foregoing, there is a need to provide an approach which integrates synchronous transmission with asynchronous transmission in such a way that a network is capable of providing guaranteed bandwidth transmission, while simultaneously providing both dynamic bandwidth sharing and lossless transmission.

As to guaranteed bandwidth transmission, its purpose is to allow a user to establish a connection with a guaranteed bandwidth. Providing guaranteed bandwidth is necessary to make a network capable of supporting services provided by synchronous networks, such as today's circuit-switched telecommunication networks.

As to dynamic bandwidth sharing and lossless transmission, this permits a user to exceed its guaranteed bandwidth whenever resources are available. Specifically, any bandwidth not allocated or bandwidth allocated to one user but not used should be made available to all others, and it should also be guaranteed that no buffer overflows will occur due to this dynamic bandwidth sharing. Achievement of this objective allows a network to make efficient use of transmission bandwidth which is essential to support variable bit-rate traffic of today's asynchronous data communication networks.

Integration of guaranteed bandwidth transmission and dynamic bandwidth sharing brings immediate benefits to both network users and network providers if a proper billing scheme is used. One possible scheme is to calculate the cost of a connection partially based on the guaranteed bandwidth and partially based on the actual number of cells transmitted. In this way, a video conferencing user may be able to save network charges by turning off the video when the meeting gets boring. Since the connection is still there, he or she can monitor the meeting with audio and restart the video transmission immediately when some thing interesting happens. Network providers, on the other hand, can benefit from the increased network utilization.

SUMMARY OF THE INVENTION

As a result of the necessity of accommodating both guaranteed bandwidth transmission and dynamic bandwidth sharing among users, in the Subject Invention this objective is accomplished by an integration of synchronous and asynchronous transmissions which permits detection of unused portions of synchronous time and permits the network be reconfigured to fill these unused portions of time with asynchronous data. The subject system thus provides traffic control which is effective enough to provide satisfactory network performance, but is also simple enough to be implemented without adding significant extra cost to the current networking products.

In a preferred embodiment, the Subject System includes a traffic control scheme for ATM networks which uses a novel timed-round-robin cell transmission scheduling algorithm combined with a simple feedback flow control mechanism to integrate synchronous and asynchronous transmissions. The timed-round-robin cell transmission scheduling provides each connection with a guaranteed transmission bandwidth and access to the full link transmission bandwidth when there is no contention from other connections. The feedback flow control mechanism ensures that no cells will get lost by disabling asynchronous transmission at an upstream node when there is not enough buffer space at a down stream node. An ATM switch design is also included which shows the feasibility of implementing the subjected system with today's switch architectures without adding significant extra cost.

More specifically, in connection-oriented packet or cell switching networks, a data transmission system and scheduling protocol utilizes both synchronous transmission and asynchronous transmission in an alternating pattern to provide each user with both a guaranteed transmission bandwidth or capacity to accommodate real-time communications, and bandwidth sharing among users to increase network utilization, while simultaneously eliminating network congestion to avoid data losses. The synchronous time slots provide for the bandwidth guarantees, while the asynchronous time slots are used to transmit data when a part of a previous synchronous time slot is not used. The asynchronous time slots also permit asynchronous data transmission using unallocated time within a given time frame. In one embodiment, time flames for data transmission are provided in which each time frame is composed of synchronous transmission times interspersed with asynchronous transmission times. For a given time frame, alternating synchronous and asynchronous transmission times are specified by a controller which determines the pattern of this alternation. In a preferred embodiment, the pattern is altered using novel timed-round-robin scheduling which transmits cells of data of respective connections over an outgoing link depending upon the synchronous transmission time allocated to each connection. To avoid data losses, asynchronous transmission is permitted only when a downstream switch indicates sufficient buffer space to accommodate asynchronous transmission from an upstream switch.

BRIEF DESCRIPTION OF THE DRAWINGS

These and other features of the Subject Invention will be better understood in connection with the Detailed Description taken in conjunction with the Drawing of which:

FIG. 10 is a block diagram of upstream and downstream switches illustrating bandwidth allocation for the two connections of the upstream switch which can be handled by the bandwidth of the associated outgoing transmission link of the downstream switch;

FIG. 11 is a block diagram of the switching network of FIG. 10 illustrating congestion in the downstream switch when the bandwidth associated with one connection of the upstream switch plus the bandwidth of a connection at the downstream switch exceeds the bandwidth of the associated outgoing transmission link of the downstream switch;

DETAILED DESCRIPTION OF THE INVENTION

Figure 1:
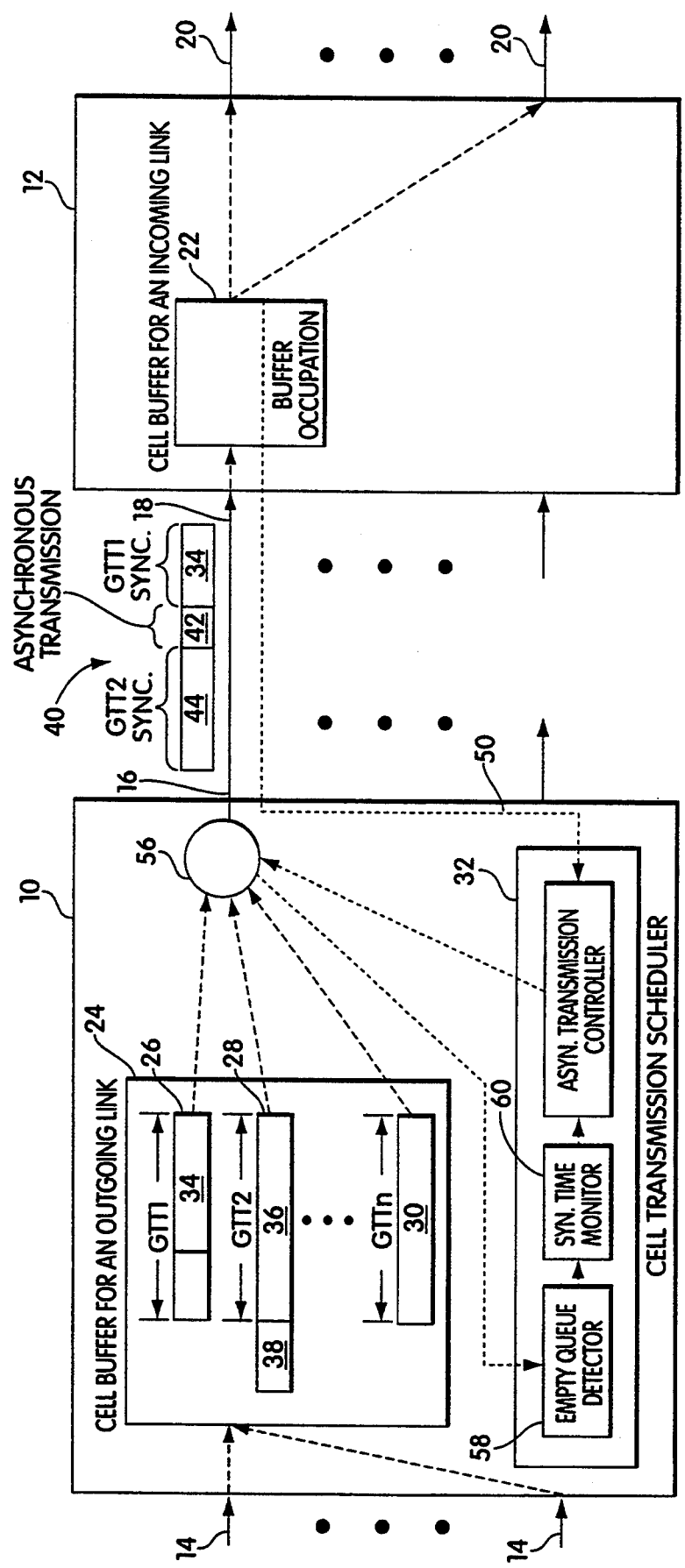
FIG. 1 is a schematic block diagram of the Subject System illustrating the timed-round-robin transmission of data in both a synchronous and an asynchronous mode determined by a cell transmission scheduler adapted to permit data transmission in asynchronous time slots based on unused synchronous transmission time.

Referring now to FIG. 1, an upstream switch 10 is coupled to a downstream switch 12. Switch 10 has a number of incoming links 14 and a number of outgoing links 16, with one of the outgoing links 18 coupled to switch 12 as an incoming link. Switch 12 has a number of outgoing links 20 to which data on link 18 may be selectively switched. Switch 12 incorporates a buffer 22 which is utilized to store incoming data and to route it to one or more outgoing links.

Within switch 10 is a buffer 24 adapted to store incoming data from various incoming links through connections to cell queues 26, 28, and 30 accomplished by conventional switching. As illustrated, incoming links 14 are connected by switch 10 to outgoing link 16 through the utilization of a timed-round-robin scheduling system which sequentially accesses data from queues 26–30 in accordance with scheduling provided by cell transmission scheduler 32.

Buffer 24 is organized in a format of one queue per connection. As used herein, a connection is defined as a single path connecting two end users. As can be seen, each queue is provided with a guaranteed transmission time, GTT, associated with a given connection. GTT1 indicates by shaded area 34 that only a part of the time needed to transmit the cells of this connection is used. Thus there is an unused synchronous transmission time for Connection 1. As can be seen by the shaded area 36, Connection 2 requires additional time to transmit its data, with the time exceeding GTT2, the guaranteed transmission time for this connection.

Since a prior connection has unused time, the additional data 38 associated with Connection 2 may be transmitted to switch 12 asynchronously. This is shown in format block 40 in which the data 34 from Connection 1 is transmitted first in the synchronous time slot associated with Connection 1. This is followed by the asynchronous transmission of data from Connection 2 as illustrated at 42. Thereafter the remainder of the data in Connection 2 is transmitted as illustrated at 44 in synchronous time slot GTT2. As will be seen, the unused time associated with GTT1 is utilized so that extra data may be transmitted in an asynchronous fashion.

The above results in efficient utilization of the transmission bandwidth by detecting unused time in a synchronous time slot and transmitting data in a variable length asynchronous time slot. In addition to efficient utilization, there is a guarantee that data will not be lost if there is sufficient buffer space at the downstream switch. This is not always the case and for this reason, a feedback path 50 is provided from switch 12 to switch 10 utilizing the bidirectional links between switches 10 and 12. The status of buffer occupation at switch 12 is provided by a so-called F-bit which is coupled to an asynchronous transmission controller 52 which interrupts or inhibits the asynchronous transmission of data to switch 12 if there is insufficient buffer space at this downstream switch.

The timed-round-robin scheduling is under the control of the scheduler 32 via a Connection 54 to transmitter 56. It is obviously important to be able to sense an empty portion of a queue. For this purpose an empty queue detector 58 is used to detect when a queue is empty during transmission to permit switching to the asynchronous mode. The control of transmitter 56 depends upon the output of synchronous time monitor 60 which determines if the synchronous time is not used up is determined by the detection of all empty queue.

Figure 2:
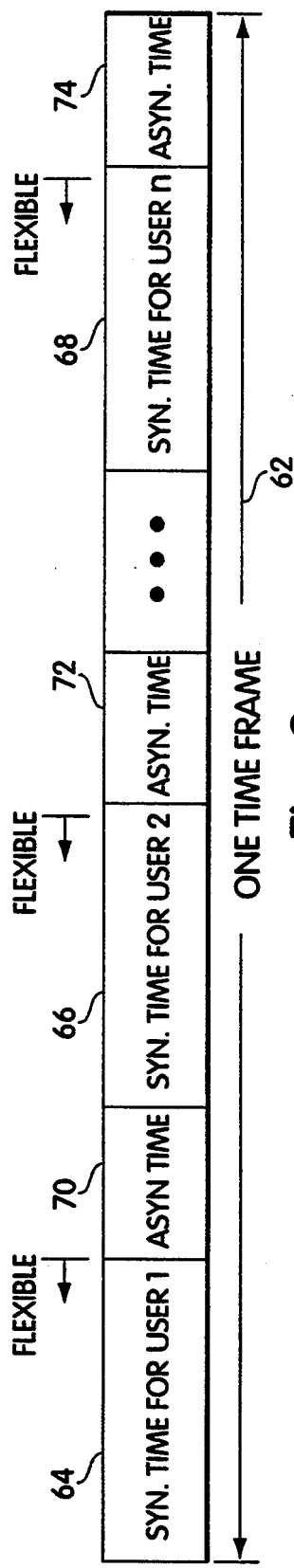
FIGS. 2 and 3 are diagrams illustrating the format or protocol for the synchronous/asynchronous transmission of data over a transmission link, showing the ability to make use of unused synchronous time by augmenting the adjacent asynchronous time slot so that it can be used to transmit data, thereby to permit dynamic bandwidth sharing.
Figure 3:
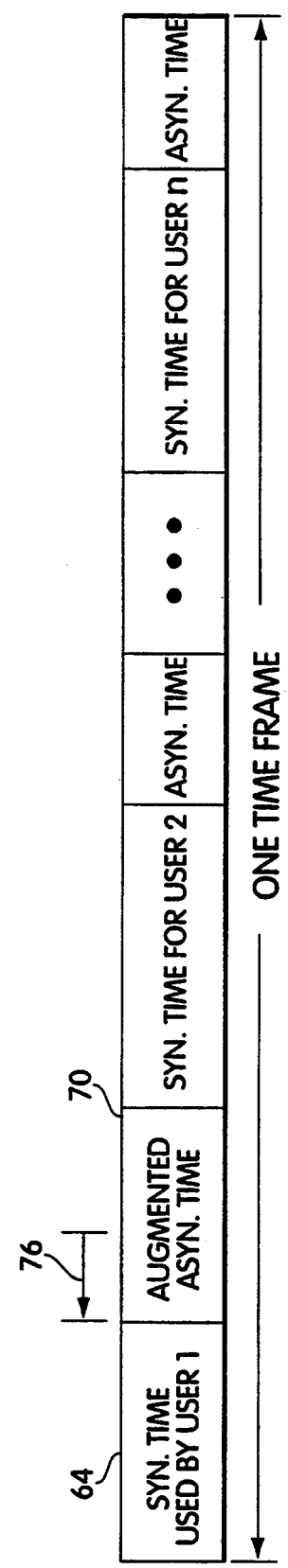

Referring now to FIG. 2, it will be appreciated that one time frame or cycle 62 includes a number of synchronous time slots 64, 66, and 68, with the time slots being variable in length depending on the guaranteed transmission time for each connection. Likewise, asynchronous time slots 70, 72, and 74 are variable length depending upon scheduling. As can be seen in FIG. 3, asynchronous time slot 70 can be augmented as indicated by arrow 76 to permit data transmission in that portion of time slot 64 for which no data for Connection 1 exists.

Figure 4:
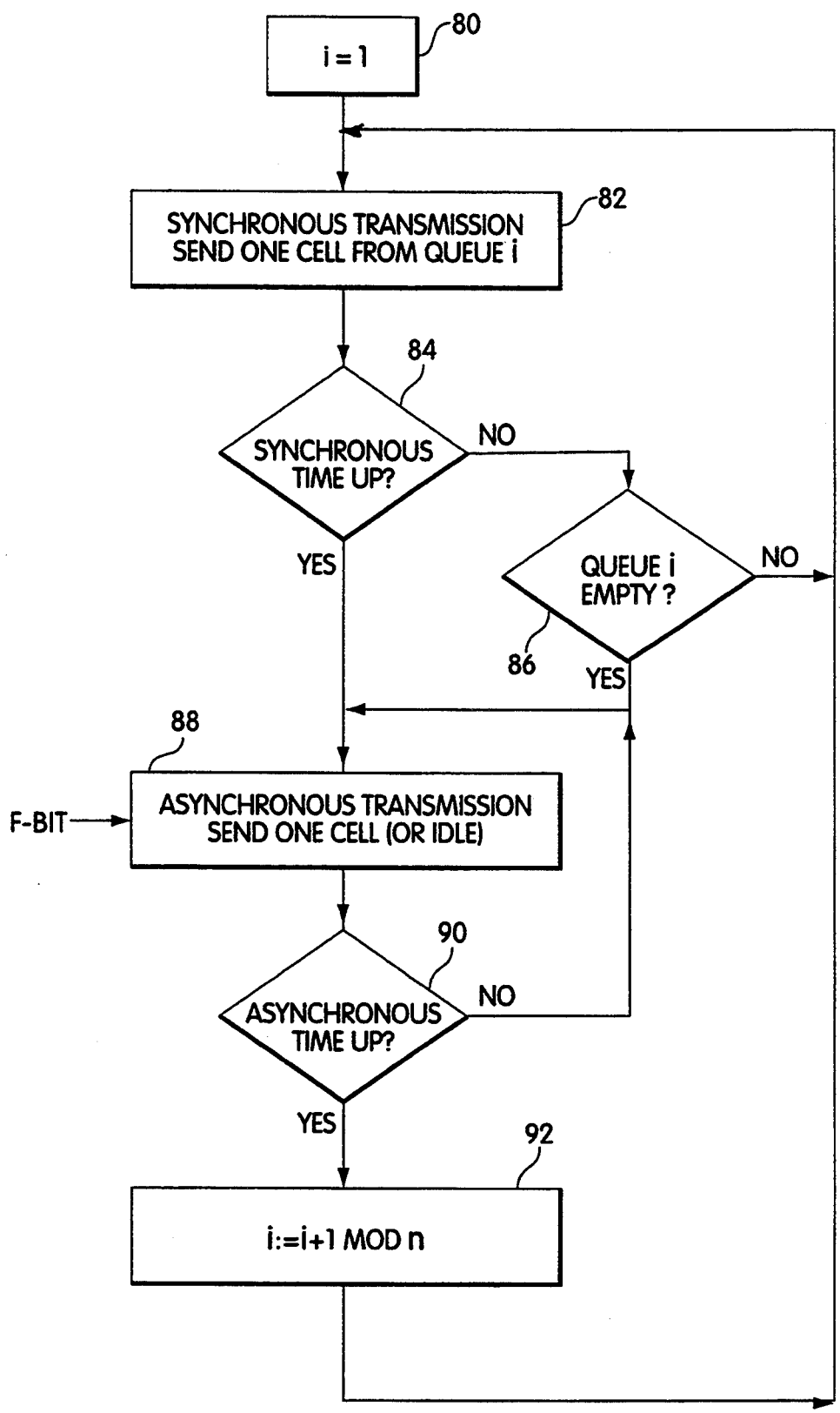
FIG. 4 is a flowchart illustrating the cell transmission scheduler of FIG. 1 showing the realization of the timed-round-robin cell transmission.

Referring now to FIG. 4, the algorithm utilized by scheduler 52 of FIG. 1 includes a block 80 indicating starting the cell transmission from the first connection. As shown by block 82, a cell of Connection i is transmitted using the guaranteed transmission time of the connection. As illustrated at 84, a timer is utilized to detect the expiration of synchronous transmission time for Connection i. If the synchronous time is not up, block 86 checks to ascertain if there are other cells in the corresponding queue. If the queue is empty, asynchronous transmission of data is authorized as illustrated at 88. Note that asynchronous transmission is also authorized when the synchronous transmission time is up. The expiration of asynchronous time is determined by timer 90, at which point the process is moved to the synchronous transmission of the next connection.

Figure 5:
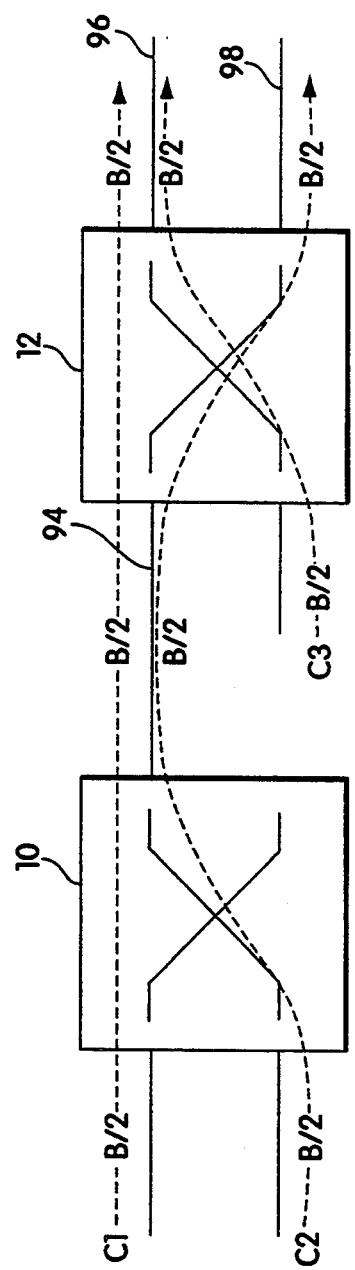
FIG. 5 is a block diagram illustrating the transmission of cells from one switch to the next switch in which conflicts are avoided by restricting the peak bandwidth that each connection can use.

Referring now to FIG. 5, the problem with the congestion is illustrated in which Connection 1 and Connection 2 to switch 10 have data each occupying one half of the link bandwidth. Data associated with Connections 1 and 2 are time multiplexed to link 94 such that Connection 1 data is outputted over outgoing link 96, whereas Connection 2 data is switched to outgoing link 98. As can be seen, a Connection 3 having data occupying a bandwidth equal to half of the link bandwidth is to be coupled to outgoing link 96. Here the link capacity of outgoing link 96 is not exceeded, i.e., B/2 from Connection 1 plus B/2 from Connection 3 equals B.

Figure 6:
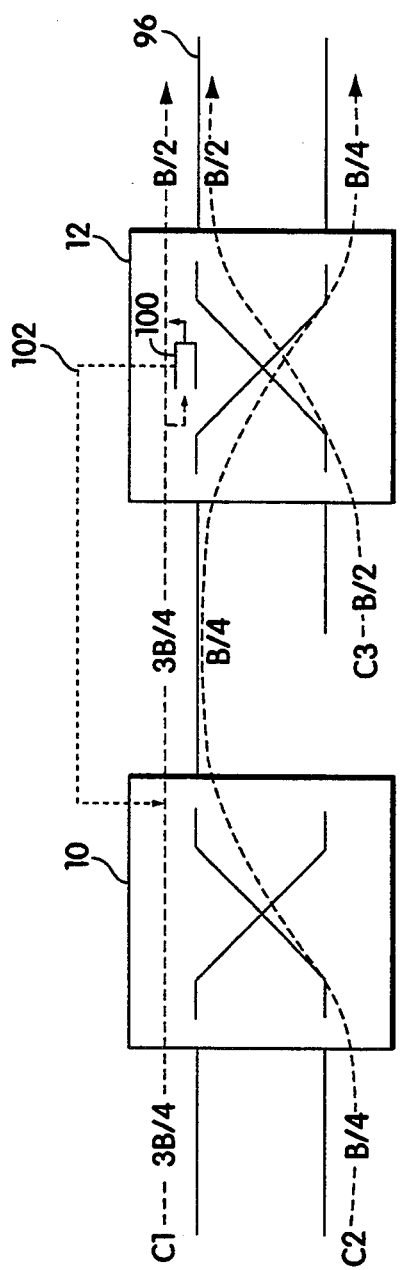
FIG. 6 is a block diagram illustrating a situation in which the dynamic bandwidth at the upstream switch can cause a conflict at the downstream switch which results in data loss due to buffer overload, also illustrating the utilization of feedback control coupled to the cell transmission scheduler of FIG. 1 which avoids the conflict through the disabling of the asynchronous transmission.

On the other hand, referring to FIG. 6, if Connection 2 uses one fourth the link bandwidth, this would ordinarily permit an increase in the bandwidth associated with Connection 1 to ¾ of the link bandwidth. However at switch 12, the bandwidth at outgoing link 96 would be exceeded because the bandwidth of data to be applied to this outgoing would be 3B/4+B/2=5B/4. In order to not to lose data, some of the data from Connection 1 must be buffered as illustrated at 100. The result of the buffering requirement is an F-bit transmission back to switch 10 as illustrated by dotted line 102 indicating buffer occupation.

Figure 7:
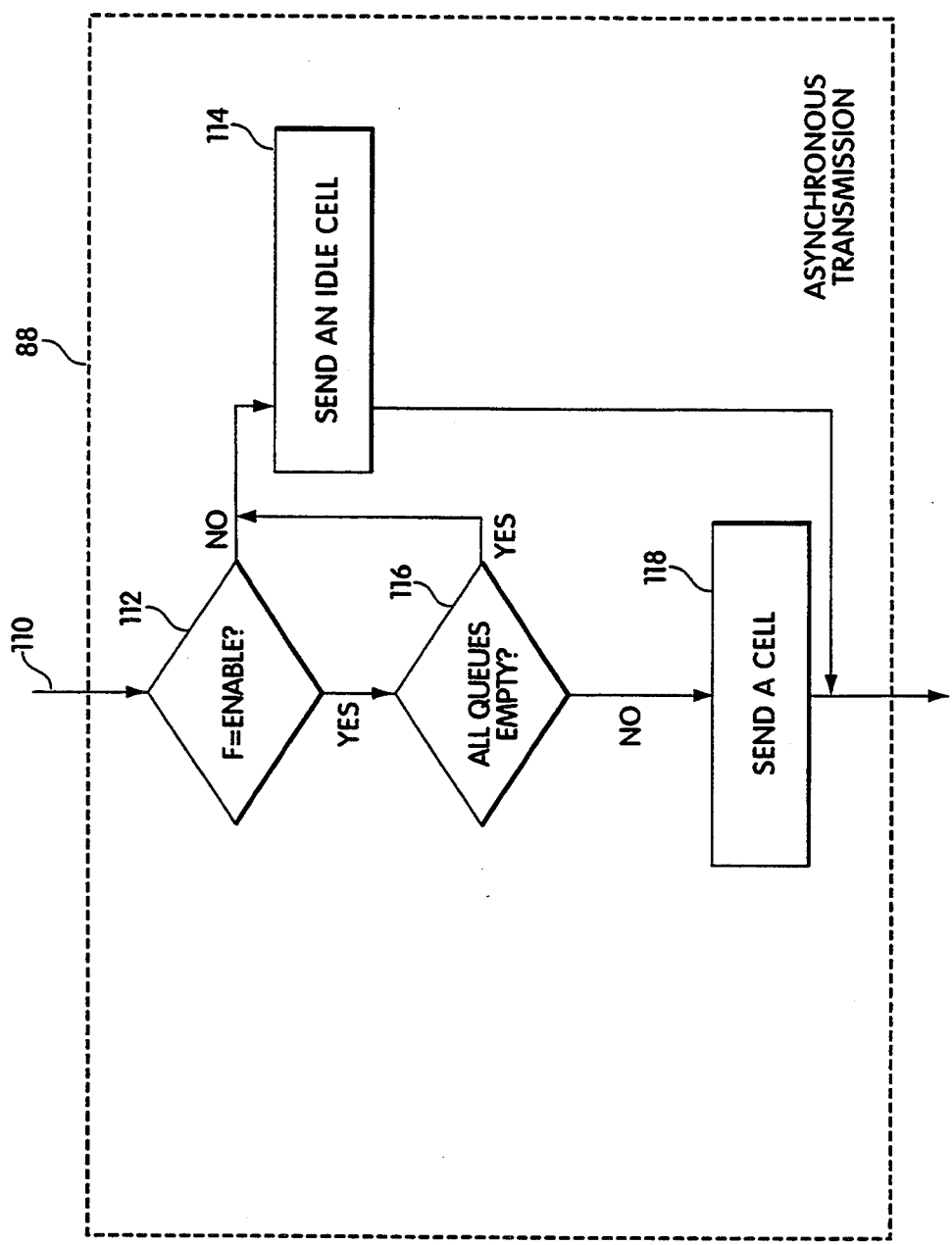
FIG. 7 is a flowchart illustrating one embodiment for accomplishing asynchronous cell transmission in the system illustrated in FIG. 4, also describing the interruption of asynchronous transmission based on the feedback from a downstream switch.

As illustrated in FIG. 7, block 88 in FIG. 4 is implemented as follows: As illustrated by arrow 110, the F-bit from the downstream switch is checked at a decision block 112 which either allows transmission of a cell or the transmission of an idle cell which is equivalent to blocking the transmission of data to the downstream switch. If there is no enabling F-bit, then block 114 provides for the sending of this idle cell. If there is an enabling F-bit, then decision block 116 checks to see if there is data to be transmitted. If all queues are empty, then an idle cell is sent. If data exists in a queue, then as illustrated at 118, a data cell is sent.

More particularly, guaranteed bandwidth transmission has long been realized in telecommunication networks with an STM, or Synchronous Transfer Mode technology. STM divides time into fixed length frames each of which is further divided into smaller time slots. Guaranteed bandwidth transmission is realized by allocating certain numbers of time slots in each frame to individual connections. Although STM has been quite successful in telecommunication networks, it is not suitable for the future integrated networks due to its inflexibility in bandwidth allocation and inefficiency in bandwidth utilization. Specifically, with STM, it is difficult to manage time slots to provide connections with different guaranteed bandwidths and allow connections to dynamically share transmission bandwidth.

ATM uses a cell-based transmission approach which does not statically allocate time-slots to connections. Each cell is a self-contained unit which can be transmitted at any time. In this way, users can share transmission bandwidth efficiently and a high network utilization can be achieved. However, a consequence of this dynamic bandwidth sharing is that it becomes difficult to provide bandwidth guarantees to connections.

One approach to solve this problem in ATM networks is to use a Stop-and-Go cell transmission scheme. Similar to STM, Stop-and-Go divides time into frames. But instead of allocating fixed time-slots within each frame to connections, Stop-and-Go uses a stop-queue and a go-queue to limit the number of cells that each connection can transmit during each time frame. In this way, bandwidth can be flexibly managed. That is, connections with different bandwidths can be easily accommodated. But limiting the number of cells in each frame diminishes the ability of dynamic bandwidth sharing.

To achieve dynamic bandwidth sharing, the Subject Invention uses a Timed-Round-Robin cell transmission scheduling algorithm to provide bandwidth guarantees in ATM networks. Timed-Round-Robin scheduling can realize similar bandwidth allocation ability as Stop-and-Go, but it has the advantage of being easier to incorporate a feedback flow control scheme to achieve dynamic bandwidth sharing and lossless transmission by using a concept of synchronous and asynchronous transmissions. Specifically, in the Subject Invention, time is divided into fixed-size frames called a Round-Robin Period, RRP. In one RRP, each connection is given a certain amount of Guaranteed Transmission Time, GTT, with which cells are transmitted without being controlled by a feedback flow control scheme. This is called synchronous transmission since each connection is periodically granted a certain amount of transmission time. Any remaining time is used to transmit cells asynchronously subject to a feedback flow control scheme. In this way, one can simultaneously achieve guaranteed bandwidth allocation and dynamic bandwidth sharing.

For the convenience of presentation, time is measured in a unit of the transmission time of one ATM cell and RRP and GTT's are all integers. Also, the term "connections" is used instead of virtual circuits, VCs, or virtual paths, VPs, as used in ATM standards to indicate that a connection can actually represent one or many VCs/VPs. The proposed timed-round-robin cell transmission algorithm is given below and illustrated in FIGS. 8 and 9:

Algorithm 1 (Timed-round-robin transmission).
1. Each link is assigned a round-robin period, RRP, which is the time of completing one round of round-robin transmission, and a round-robin timer, RRT, which controls the time that each connection can use to transmit its cells.
2. According to its requested bandwidth, a connection is assigned a guaranteed transmission time, GTT, over each link it passes through. GTT/RRP×link bandwidth is the bandwidth allocated to the connection over a link.
3. Suppose there are n connections, $CN_1, \ldots, CN_n$, established over a transmission link with guaranteed transmission times $GTT_1, \ldots, GTT_n$, respectively. Let $T_i = GTT_1 + \ldots + GTT_i$ be the accumulated guaranteed transmission time of the first i connections, and $\delta = RRP - T_n$ be the unallocated transmission time in a time frame RRP. Then, cell transmissions are scheduled in a timed-round-robin manner as follows:

Step 1: Set i:=1 and RRT:=0.
Step 2: Transmit up to $GTT_i$ cells of $CN_i$, or more specifically, transmit cells of $CN_i$ until RRT reaches $T_i$ or all cells of $CN_i$ have been transmitted. Cells transmitted in this way are marked as synchronous cells.
Step 3: Transmit cells with an asynchronous transmission algorithm described in the next Section until RRT reaches $T_i + i\delta/n$ . Cells transmitted in this way are marked as asynchronous cells.
Step 4: If i<n, set i:=i+1 and go to Step 2. Otherwise, go to Step 1.

Figure 8:
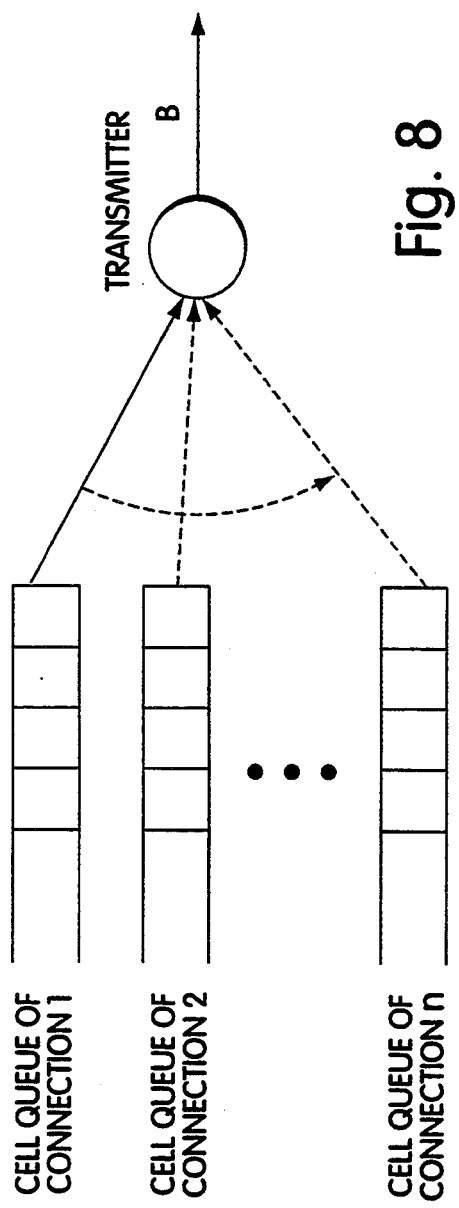
FIG. 8 is a simplified schematic diagram of the timed-round-robin cell transmission scheduling technique of FIG. 1 illustrating sequential sampling of the data in a series connection.
Figure 9:
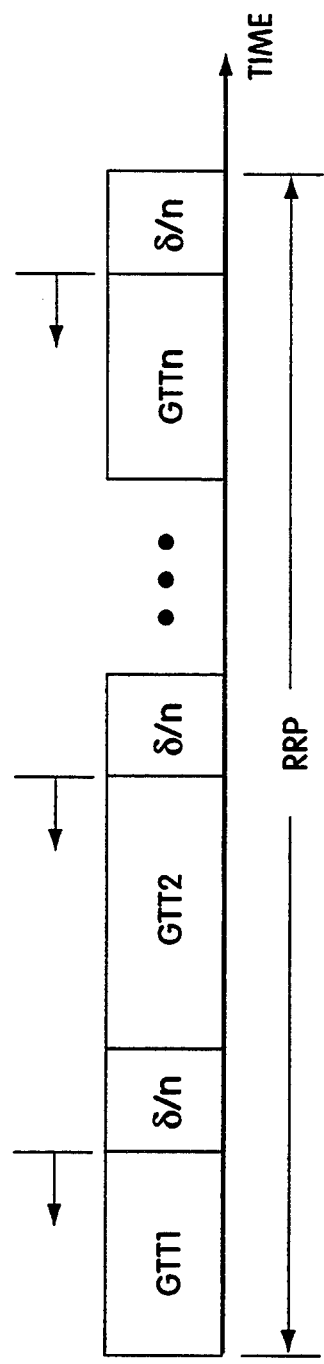
FIG. 9 is a timing chart for synchronous and asynchronous transmission illustrating guaranteed transmission times for different connections and variable length asynchronous time slots such that both guaranteed and reliable transmission of data can be achieved efficiently through dynamic utilization of transmission capacity or bandwidth.

FIGS. 8 and 9 show a queuing structure for round-robin transmission and a pattern of alternations between synchronous and asynchronous transmissions when each connection uses all its guaranteed transmission time transmitting synchronous cells. If a connection does not use all its assigned guaranteed transmission time, the remaining time is used for asynchronous transmission as indicated by the small arrows in the time chart.

Since connection i is guaranteed to have $GTT_i$ units of time to transmit its cells during a time period of RRP, it is guaranteed to be able to use $B_i=(GTT_i/RRP)\times B$ average bandwidth over the link. A further observation is that if no more than $GTT_i$ cells of connection i arrive at a node in any RRP units of time, and recalling that 1 time unit equals the transmission time of one cell, connection i is always able to transmit all its cells queued at the node each time it gets its turn to transmit. This leads to the following two properties of Algorithm 1 under a condition that the average cell arrival rate of a connection over a time period of RRP does not exceed the allocated bandwidth of the connection:

The first property is that the worst-case cell queuing delay at one node is bounded by RRP. The second property is that the maximum buffer needed for connection i is bounded by the $GTT_i$.

These two features make ATM networks capable of supporting services supported by today's circuit-switched networks since bounded delay and lossless transmission are guaranteed as long as an application does not exceed its allocated communication bandwidth.

The round-robin period RRP is an important parameter which affects the performance of Algorithm 1. On one hand, it is desirable to set a small RRP to achieve small cell delays and low buffer requirement. On the other hand, RRP determines the grain of bandwidth allocation. If the link bandwidth is B, then the minimum bandwidth that can be allocated to a connection is B/RRP. For example, to set up a 64 Kb/s connection over a 150 Mb/s link, RRP should be no smaller than 150,000/64=2344, resulting in a maximum cell delay of about 6.3 ms over the link.

Of course, one can easily make some enhancements to the basic timed-round-robin algorithm discussed above. For example, a smaller worst-case delay can be achieved by splitting a high-bandwidth connection into several low-bandwidth connections, and a finer bandwidth allocation grain can be achieved by multiplexing several low-bandwidth connections into a single high-bandwidth connection. Also, there is no particular reason for interleaving the unallocated transmission time $\delta$ with the guaranteed transmission times in the way shown in FIG. 9. One may distribute $\delta$ in some other way for some purpose, e.g., easy implementation or low-latency communication.

As explained in Algorithm 1, GTT/RRP×link bandwidth is the bandwidth guaranteed to a connection over a link. So to establish a connection of bandwidth $B_c$ over a link of bandwidth B with a round-robin period RRP, the required guaranteed transmission time for the connection is GTT= $\lceil B_cRRP/B \rceil$, where $\lceil x \rceil$ is a ceiling function which equals the smallest integer number larger than or equal to x. The connection can be accepted over a link if the summation of GTTs over all connections passing through the link does no exceed RRP. An addition or deletion of a connection needs to change the values of $T_i$'s and $\delta$, which can be done at the end of a round-robin transmission period.

One problem with the above connection establishment procedure is that due to the ceiling operation in calculating GTTs, a connection may be allocated slightly different bandwidths over links with different RRPs. If the bandwidth allocated to a connection over an upstream link is larger than that over a downstream link, cell losses might happen. Since a connection is usually established sequentially over links from its source to destination, this problem can be avoided by using the bandwidth actually allocated to a connection at an upstream link to calculate the GTT required at the next downstream link. In this way, lossless synchronous transmission is guaranteed.

Algorithm 1 would behave very much like STM or Stop-and-Go if no asynchronous transmission were allowed in Step 3. Each connection is allocated a certain amount of bandwidth, but any unused or unallocated bandwidth is wasted. So the next step is to develop an asynchronous transmission algorithm to make efficient and safe use of the remaining bandwidth. By "efficient" is meant that one should be able to transmit as many asynchronous cells as possible, and by "safe" is meant that one should not transmit too many cells as to overflow a downstream node and cause cell losses.

FIGS. 10 and 11 show an example that an uncontrolled dynamic bandwidth sharing may cause buffer overflows. Suppose that three connections, C1, C2, and C3, are each allocated one half of the link transmission bandwidth as shown in FIG. 10. No congestion will occur if each connection uses its own allocated bandwidth only. However, if at a certain time, C2 uses only one half of its allocated bandwidth and the unused half is dynamically shared by C1, then cell losses may happen due to a congestion at a downstream node as shown in FIG. 11. To completely avoid cell losses, dynamic bandwidth sharing, i.e., asynchronous transmission in Algorithm 1, should be permitted only when there is enough buffer space at a downstream node.

Figure 12:
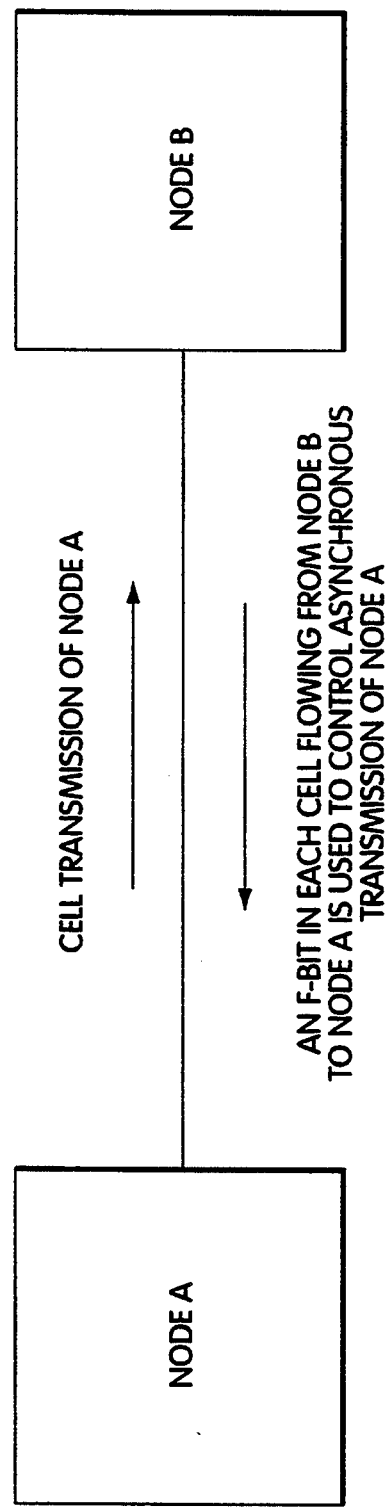
FIG. 12 is a block diagram illustrating the feedback to an upstream switch of the buffer status of a buffer in a downstream switch to inhibit asynchronous data transmission until such time as there is sufficient buffer space in the downstream switch.

In the Subject Invention, a simple link-by-link feedback flow control scheme is used to enable or disable asynchronous transmissions of a node. As shown in FIG. 12, an F-bit in each cell flowing from a downstream node B to a current node A is used to control asynchronous transmissions of Node A, For simplicity, it is assumed that transmission bandwidths in both directions are the same. The F-bit is marked either as ENABLED or DISABLED. Node A is allowed to transmit asynchronous cells to Node B only when it is receiving F=ENABLED cells from node B. With this feedback flow control scheme, an appropriate F-bit setting algorithm can be used at Node B to ensure that there is no buffer overflow by disabling the asynchronous transmission of node A when otherwise it will cause a buffer overflow at node B, and there is no buffer underflow by enabling the asynchronous transmission of node A when it will not cause a buffer overflow at node B.

Figure 13:
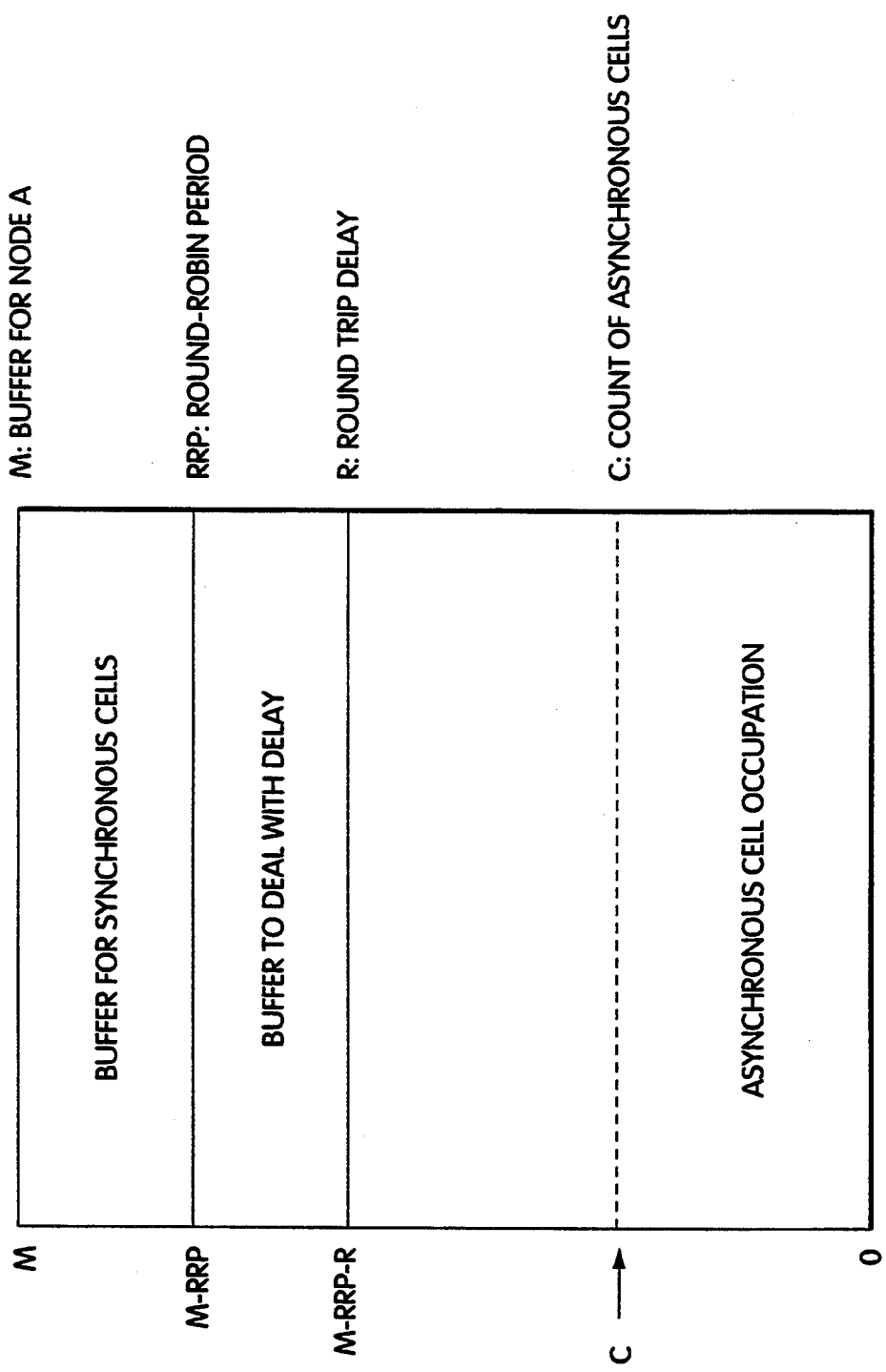
FIG. 13 is a diagrammatic representation of buffer management protocol for the buffer for a downstream switch illustrating buffer space allocated to the associated upstream switch.

For simplicity, a cell inserting scheme is used which transmits idle cells containing the feedback information only over otherwise idle transmission links. Thus Node A continuously receives either F=ENABLED or F=DISABLED cells from Node B. Also supposing that a buffer space of M cells is allocated at node B to store cells from node A as shown in FIG. 13, since synchronous transmission is not control by a feedback control scheme, according to Section 2, in the worst case a buffer of RRP cells is needed to store synchronous cells, resulting a buffer of M−RRP cells for asynchronous cells. Let R be the round-trip propagation delay from node B to node A. Then after node B starts marking F-bits as DISABLED, there still could be up to R asynchronous cells arriving from node A. Thus a simple F-bit setting algorithm would be to set F=DISABLED when the number of asynchronous cells reaches $M-RRP-R$ and set F=ENABLED when the number goes below $M-RRP-R$ as shown below.

Algorithm 2 (F-bit setting algorithm 1).
1. A counter C is used to record the number of asynchronous cells arrived from node A which are currently being buffered at node B.
2. Set F:=DISABLED when $C \geq M-RRP-R$, and F:=ENABLED otherwise.

However, there are two problems with this simple approach.

First is the problem of counting of asynchronous cells. In an ATM network, cells belonging to one connection are transmitted in a FIFO, or First In First Out order. Thus asynchronous cells arrived from Node A may be transmitted with synchronous transmission times, i.e., $GTT_i$'s, at Node B. This complicates the problem since it reduces the transmission time allocated to synchronous cells and may cause them to stay at Node B for a time period longer than RRP. A consequence of this is that a buffer space of more than RRP cells might be required to store synchronous cells. Thus counting asynchronous cells only can not prevent buffer overflows.

Second is the problem of buffer underflow. Algorithm 2 can not prevent buffer underflows. It is possible that node B has a free buffer of up to R cells, but no asynchronous transmission is allowed from node A. This may cause significant buffer and bandwidth wastes for networks with large inter-node propagation delays. In the worst-case where $R > M-RRP$, the asynchronous transmissions will be completely blocked.

To solve the first problem, it is observes that instead of doing FIFO transmission for each connection, if Node B uses a scheduling algorithm which always transmits synchronous cells first with guaranteed transmission times and asynchronous cells first when in an asynchronous transmission mode, then C can be simply calculated as the number of asynchronous cells arrived from Node A which are currently stored in Node B. The reason for this to be true is that with this scheduling policy, no synchronous cells will experience delays longer than RRP. Thus a buffer space of RRP cells is enough to accommodate all synchronous cells from Node A. Consequently, one only needs to make sure that the number of asynchronous cells in Node B does not exceed $M-RRP-R$.

However, the above described scheduling algorithm can not be actually used since ATM requires to maintain a cell transmission order for each connection. In other words, the FIFO scheduling has to be used for cells belonging to the same connection. This problem is solved by "swapping" cell types. Specifically, when Node B transmits an asynchronous cell of connection i with the guaranteed transmission time $GTT_i$ and there is another synchronous cell of connection i in Node B, the types of these two cells are "swapped" by treating this situation as if a synchronous cell were transmitted and the asynchronous cell still remained in the buffer. This approach is detailed in the following algorithm:

Algorithm 3 (Management of counter C).
1. In addition to using a counter C to record the number of asynchronous cells, a counter $S_i$ is used to record the number of synchronous cells of the connection i, i=I, ..., n.
2. C is increased by 1 when an asynchronous cell arrives from Node A, and $S_i$ is increased by 1 when a synchronous cell of connection i arrives from Node A.
3. When Node B transmits a cell of connection i with the guaranteed transmission time $GTT_i$, then
   (a) if the cell is a synchronous one, decrease $S_i$ by 1,
   (b) if the cell is an asynchronous one, decrease $S_i$ by 1 if $S_i > 0$, otherwise, decrease C by 1.
4. When Node B transmits a cell of connection i with the asynchronous transmission algorithm (i.e., Step 3 in Algorithm 1), then
   (a) if the cell is an asynchronous one, decrease C by 1,
   (b) if the cell is a synchronous one, decrease C by 1 if $C > 0$, otherwise, decrease $S_i$ by 1.

To solve the buffer underflow problem, an algorithm is needed which does not always set F=DISABLED when $C > M-RRP-R$. The reason for setting F=DISABLED when C reaches $M-RRP-R$ in Algorithm 2 is that due to a round trip propagation delay R, node B may receive up to R asynchronous cells from node A after it sets F=DISABLED. However, a further observation is that node B will not receive any asynchronous cells from node A after it has set F=DISABLED for R units of time. So if the value of C at this time is not larger than $M-RRP$, node B can safely send out $M-RRP-C$ cells with F-bits set to ENABLED to node A which would allow node A to transmit up to this number of asynchronous cells. This approach can be realized with the following F-bit setting algorithm.

Algorithm 4 (F-bit setting algorithm 2).
1. A counter C is maintained using Algorithm 3.
2. Let t be the current time, $t_{de}$ and $t_{ed}$ be the last time that F changes its value from DISABLED to ENABLED and firm ENABLED to DISABLED, respectively. Let $C_{de}$ be the value of C at time $t_{de}$. Then the F-bit is set as follows:

Step 1: If $C < M-RRP-R$, set F:=ENABLED. Otherwise, go to Step 2.
   Step 2: If $C < M-RRP-R$ at time $t-1$ (i.e., C is increased to $M-RRP-R$ at t), set $t_{ed}:=t$ and F:=DISABLED. Otherwise, go to Step 3.
   Step 3: If $t < t_{ed}+R$, set F:=DISABLED. Otherwise, go to Step 4.
   Step 4: If $C = M-RRP$, set F:=DISABLED. Otherwise, go to Step 5.
   Step 5: If F=DISABLED at time $t-1$, set $t_{de}:=t$, F:=ENABLED, and $C_{de}:=C$. Otherwise, go to Step 6.
   Step 6: If $t < t_{de}+M-RRP-C_{de}$, set F:=ENABLED. Otherwise, set F:=DISABLED and $t_{ed}:=t$.

Figure 14:
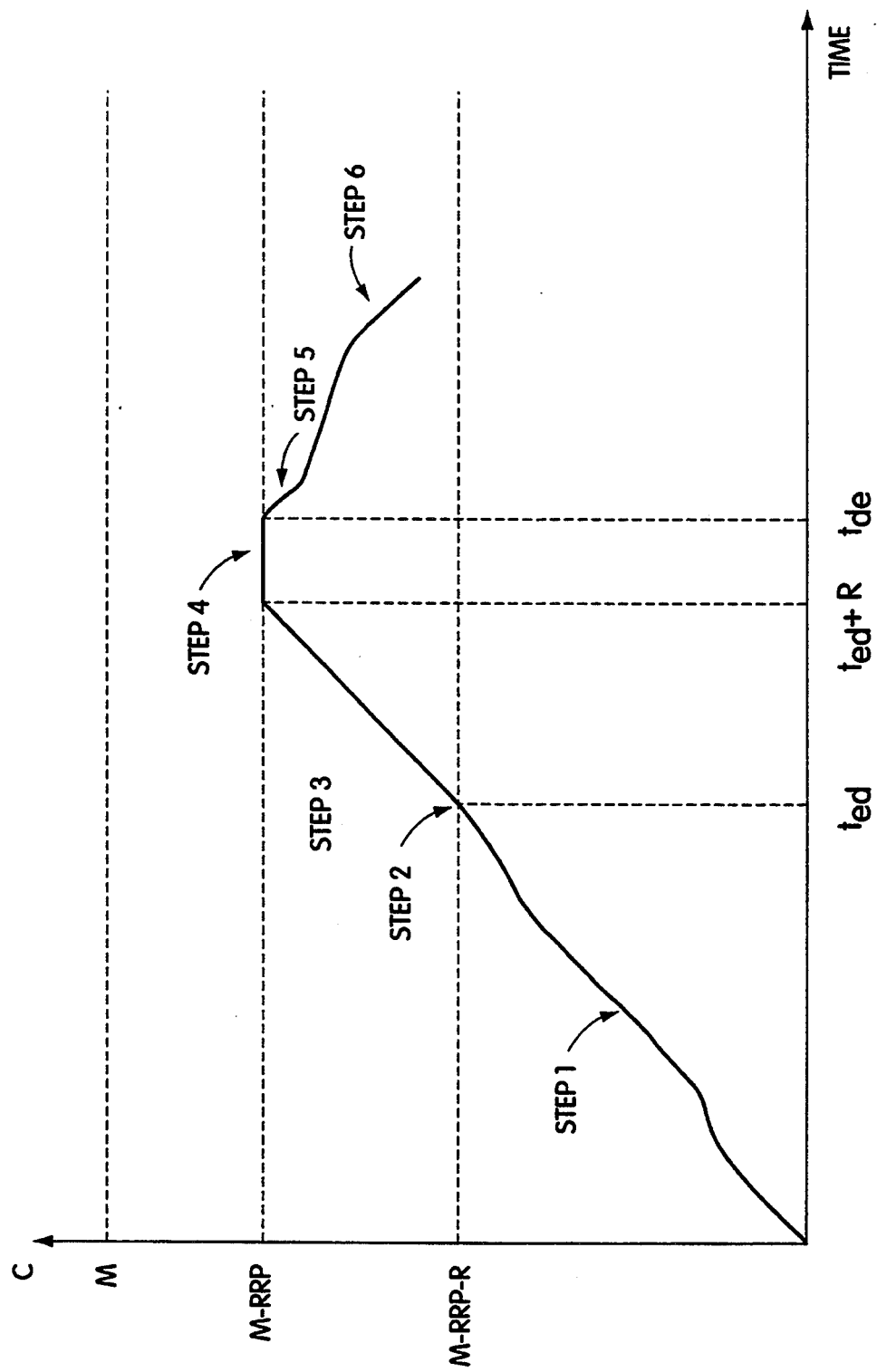
FIG. 14 is a graph illustrating the setting of the F-bit in the algorithm which controls the transmission of asynchronous data, in which the F-bit is set in accordance with the count of asynchronous cells in the buffer of FIG. 13.

The above algorithm is illustrated in FIG. 14. When C is below $M-RRP-R$, it is always safe to allow node A to send asynchronous cells. So in Step 1, cells sent from node B to node A are marked with F=ENABLED. Step 2 detects the time when C is increased to $M-RRP-R$ and sets $t_{ed}$ and F=DISABLED to stop asynchronous transmission of Node A. However, due to the round trip propagation delay R, node B may still receive asynchronous cells from Node A. So Step 3 continues to set F=DISABLED. In the worst case, up to R extra asynchronous cells arrive at node B which may make C reach $M-RRP$ at time $t_{ed}+R$. Step 4 deals with this situation by continuing to set F=DISABLED. Step 5 detects the time when F can be set to ENABLED and sets $t_{de}$, $C_{de}$. Then, up to $M-R-C_{ed}$ cells can be set with F=ENABLED (Step 6). If $C \geq M - RRP - R$ after that, F is set to DISABLED and $t_{ed}$ to the current time, which will make F be set to DISABLED for R units of time in Step 3 if C keeps above the $M - RRP - R$ level.

Algorithm 4 is still conservative since it is assumed that up to R extra asynchronous cells may arrive from Node A after $t_{ed}$ (i.e., when F is changed from ENABLED to DISABLED). This is not always true. For example, under certain conditions, only up to $M - RRP - C_{de}$ extra asynchronous cells may arrive after F is set to DISABLED in Step 6. So it is possible to develop a more efficient F-bit setting algorithm than Algorithm 4 at an extra implementation cost.

Another issue about the asynchronous transmission algorithm is the transmission scheduling policy to be used while Node A is receiving F=ENABLED cells from node B. Stating in another way, when Node B allows node A to do asynchronous transmission, what cells should Node A pick up to transmit? The answer to this question depends on the desired performance of asynchronous transmission. If fairness among connections is required, then a pure round-robin scheduling policy can be used. Also, priority or timed-round-robin scheduling can be used to distinguish importance between connections.

Some comparisons of the Subject feedback flow control systems with others are as follows. Traditionally, those involved with telecommunication have been quite reluctant to accept the concept of feedback flow control since it is in general not needed for constant bit-rate traffic. However, with the introduction of ATM and the requirement for supporting variable bit-rate traffics, more and more have realized that it would not be possible to achieve a satisfactory network utilization without a feedback flow control mechanism. Many schemes for implementing such a mechanism have been proposed, and among them the most similar ones are the link-by-link per-connection credit-based feedback flow control schemes. Comparing with these schemes, the Subject Invention has been significantly simplified in the following two ways:

First is per-link instead of per-connection feedback control is used. To avoid a problem that one connection may block transmissions of all other connections over a link, a per-connection feedback control approach was used in previous schemes. Per-connection control means that each connection must maintain its own credit count which is updated using the information transmitted individually from a downstream node. Also, the buffer space is statically allocated to each connection. A consequence of this is the complexity of the credit management mechanism and the requirement for a large buffer to achieve dynamic bandwidth sharing.

With a timed-round-robin cell transmission scheme, each connection is guaranteed a certain amount of minimum bandwidth and no connections will be blocked completed. Thus one can use a per-link feedback control scheme which treats all connections over a link as a single one. This significantly simplifies the feedback mechanism and reduces the buffer requirement.

The second simplification involves state-based instead of credit-based feedback control. Thus another simplification which has been made is the usage of just 1 bit in a feedback cell to indicate the current buffer occupation state at a downstream node, instead of the credit count value. This makes it possible to encode the feedback information in regular cells flowing from a downstream node to a current node and relieves a node from the burden of creating special feedback cells. Also, letting regular cells carry feedback information enables realization of continuous feedback control by using a cell insertion scheme.

The above two simplifications make Subject System easier to implement and requiring smaller buffer space than that of previous feedback control schemes while maintaining a comparable bandwidth sharing capacity.

An implementation of the proposed traffic control scheme in ATM switches is now presented. The objective is to show that the Subject System can be implemented without adding significant complexity to the existing switches. For purpose of exponation, only an architectural design is given.

Figure 15:
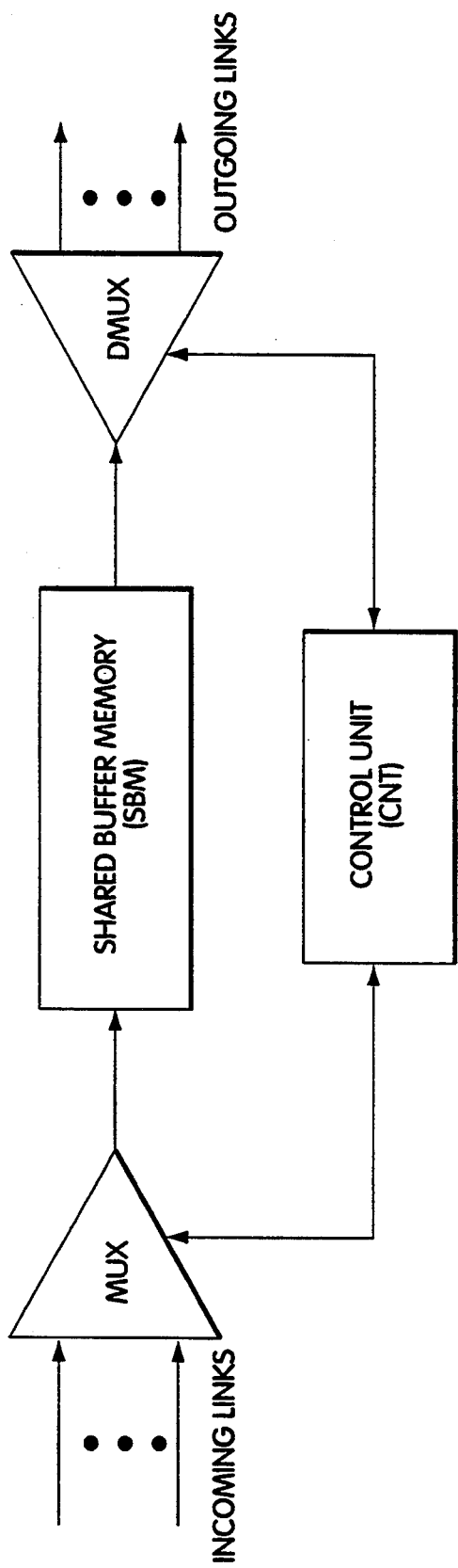
FIG. 15 is a block diagram illustrating shared buffer memory and a control unit along with multiplexing and demultiplexing circuits within a switch.

For simplicity, a shared-buffer ATM switch is assumed as shown in FIG. 15. Incoming cells are multiplexed and stored in a Shared Buffer Memory 200 which are later demultiplexed to their corresponding outgoing links and transmitted to their next nodes. A Control Unit 202 provides idle addresses in the memory 200 to a multiplexor 204 to store incoming cells. Control Unit 202 also provides addresses of cells stored in the memory 200 to a demultiplexor 206 for cell transmissions.

Figure 16:
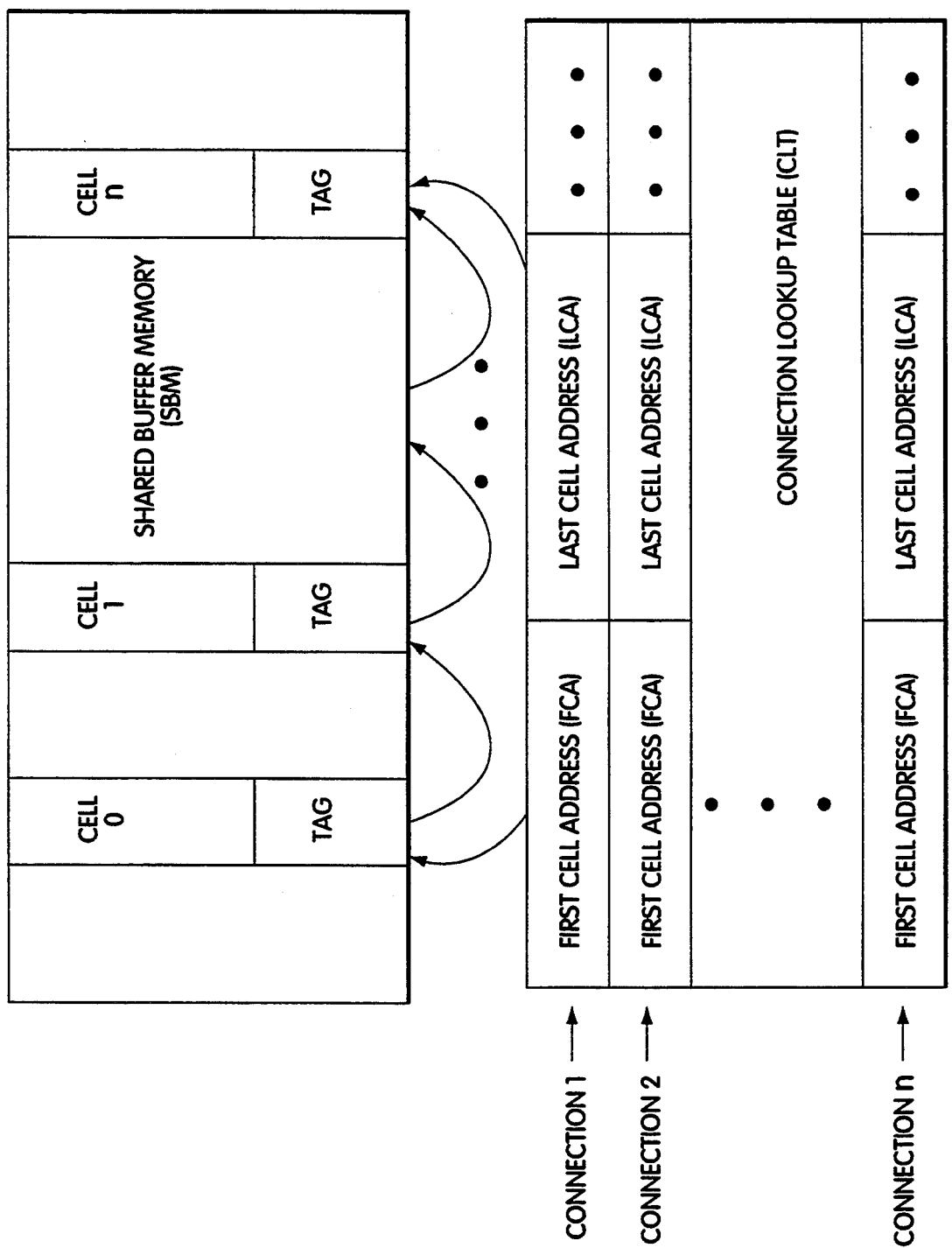
FIG. 16 is a diagram illustrating a linked-list queueing structure to organize cell queues for connections passing through a switch.
Figure 17:
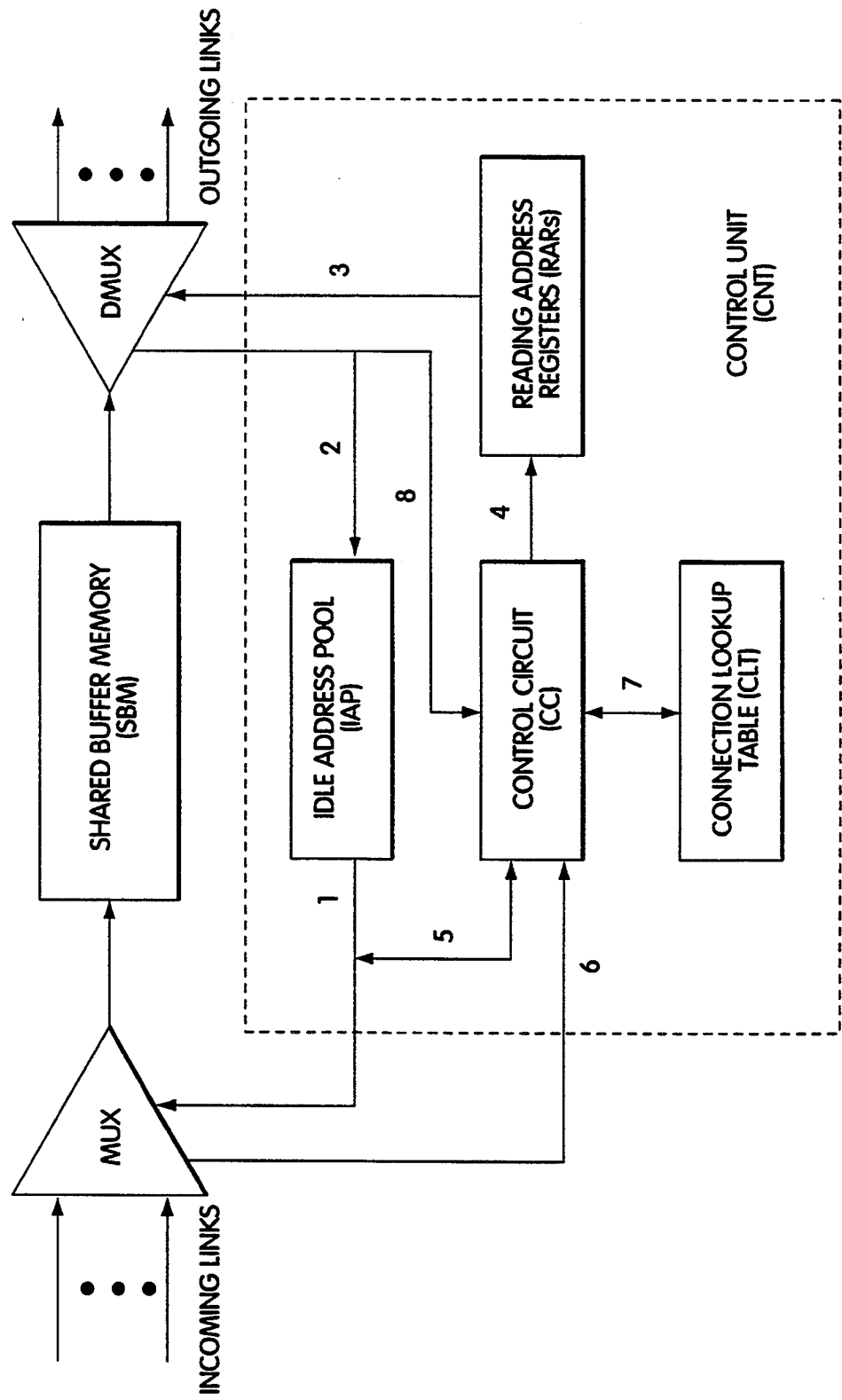
FIG. 17 is an expanded block diagram of the control unit of FIG. 15 illustrating an idle address pool, a connection lookup table coupled to a control circuit for specifying the address for incoming cells to be store in the shared buffer memory, for updating the reading address registers, and for implementing timed-round-robin cell transmission scheduling.

A key requirement to implement a round-robin cell transmission scheme is to maintain a FIFO cell queue for each connection. One way of doing this is to use a linked-list queueing structure as shown in FIG. 16. A tag 210 is added to a cell 212 stored in memory 200 which serves as a pointer to the location of the next cell 210' in a queue. The addresses of the first and last cells of queues are stored in a Connection Lookup Table 216 in Control Unit 202. The architecture of Control Unit 202 is shown in FIG. 17 which manages the cell queues and schedules cells to be transmitted in the following ways:

First, an Idle Address Pool 200 is used to store idle addresses in the memory 200 where incoming cells can be stored. One address is allocated from pool 220 to each incoming cell as shown by path 1 in FIG. 17. When a cell is transmitted, its address in memory 200 is returned to pool 220 via path 2.

Secondly, a Reading Address Register 222 is used for each outgoing link which provides the address of the cell in memory 200 which should be transmitted next as illustrated by path 3. Registers 222 are updated by a Control Circuit 224 via path 4 according to the cell transmission scheduling algorithm used.

Thirdly, a Connection Lookup Table 224 is used to store information for each connection. The information useful for implementing the proposed traffic control scheme includes: addresses of the first and last cells of cell queues, allocated Guaranteed Transmission Times $GTT_i$'s, synchronous cell counts $S_i$'s, pointers to the next and last connections to realize a desired round-robin order, etc.. Connection Lookup Table 226 can be constructed as an individual component, or more conveniently, be combined with the existing virtual-circuit routing tables in ATM switches.

Management of cell queues is done as follows. When a cell arrives at an incoming link, an Idle Address is read from the pool 220 where the cell is to be stored. This Idle Address and the header of the incoming cell which contains the connection identification number are also forwarded to a Control Circuit 224 via paths 5 and 6. If the First Cell Address of the connection in Connection Lookup Table 226 is not set, i.e., the queue is empty, both the First Cell Address and Last Cell Address are set to be the Idle Address via path 7. Otherwise, only the Last Cell Address is set to be Idle Address and the original value of the last cell address is sent to MUX 204 so that the tag of the cell stored at the original last cell address can be updated to be the Idle Address via paths 7 and 5.

When a cell is transmitted, the First Cell Address field should be updated to the address of the next cell in the queue. This is done by writing the tag of the cell transmitted into the the First Cell Address field via paths 8 and 7. To reduce the frequency that Connection Lookup Table 226 is accessed, this operation only needs to be performed at a connection switching time, i.e., when a transmitter stops transmitting cells of one connection and switches to another connection.

Once a FIFO cell queue is maintained for each connection, it is be straight-forward to design a control circuit 224 to implement the timed-round-robin cell transmission algorithm. Since time is measured in a unit of one cell transmission time, a counter can be used to act as the round-robin timer RRT for each outgoing link. Let $Cell_0$ be the cell currently being transmitted, and $Cell_1$ the next cell to be transmitted. According to the rules specified in Algorithm 1, Control Circuit 224 performs one of the following three actions to provide the address of $Cell_1$, denoted by $p_1$, to Reading Address Registers 222:

1. If $Cell_0$ and $Cell_1$ belong to the same connection, set $p_1 :=$ tag of $Cell_0$.
2. If $Cell_1$ belongs to a connection $C_i$ which is different from that of $Cell_0$, set $p_1 :=$ FCA of connection i which is stored in the CLT.
3. If no cell is to be transmitted next, set $p_1$ to be the address of an idle cell stored in memory 200 which carries feedback information only, i.e., cell insertion.

Implementation of the proposed feedback flow control scheme is also easy. One bit in an ATM cell header is needed to serve as the F-bit and another one to distinguish a synchronous cell from an asynchronous one. Since the usage of three Generic Flow Control, GFC, bits in the ATM cell header has not been defined, it is assumed that two of them can be used. The values of these two bits are determined by Control Circuit 224 according to Algorithm 1 and Algorithm 4 which are then transferred to DMUX 206 via paths 4 and 3 in FIG. 17, and inserted into a cell at the time when it is transmitted.

Figure 18:
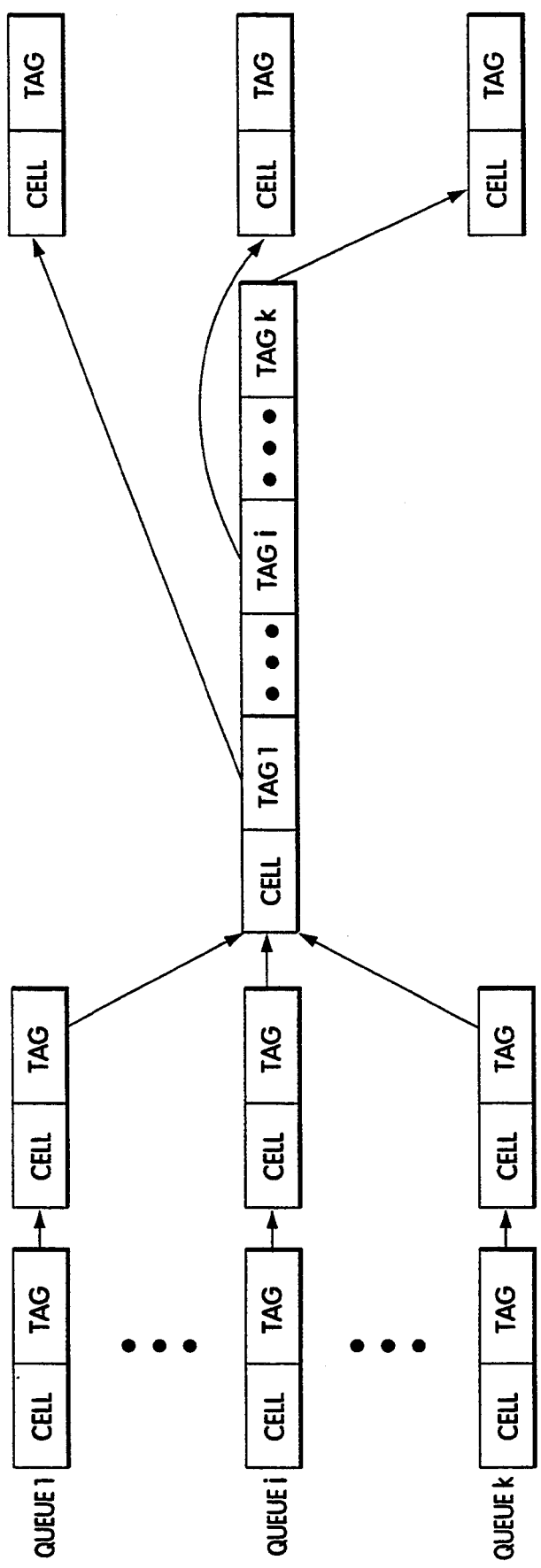
FIG. 18 is a diagram illustrating an enhanced linked-list queueing structure to handle multicast cells, cells which are to be sent to multiple outgoing links; and, FIG. 19 is a diagram illustrating the implementation of the queueing structure of FIG. 18 in a shared buffer memory.

From the above discussion, one can see that with the usage of a linked-list queueing structure, the proposed traffic control scheme can be easily implemented in an exiting ATM switch architecture. However, one problem with the conventional linked-list structure is its inability to support multicast transmissions in a shared-buffer switch where one cell may appear in several queues. This problem is solved by using the enhanced linked-list data structure shown in FIG. 18 where a cell belonging to multiple queues uses multiple tags each pointing to the next cell of a queue. By associating each tag with a queue either explicitly, e.g., putting a queue ID in a tag, or implicitly, e.g., the ith tag is for ith queue, the enhanced linked-list would be able to handle multicast cells. Also, if one clears tag i when the cell has been transmitted in queue i, it is easy to determine when a multicast cell can be removed from the buffer by checking whether or not all tags have been cleared.

Implementation of the enhance linked-list queueing structure in the memory 200 can be done in one of the following two ways:

The first way is to enlarge the tag field. One can make the tag field of every cell large enough to hold the maximum number of pointers, i.e., the number of ports of a switch. For example, for a 16×16 switch with an shared buffer memory capable of storing 64K cells, i.e., 2 bytes addressing space, the tag field of a cell needs to be 2 bytes×16 ports=32 bytes long which represents a 32/53=60% of buffer overheads.

The second way is to use an indirect addressing scheme. Since not every cell is a multicast one, one can reduce the buffer overheads by making the tag field of a cell just large enough to hold one pointer, 2 bytes in the above example. For a unicast cell, its tag directly points to the next cell in a queue as shown in FIG. 16. For a multicast cell, this tag is served as an indirect pointer to a place where actual pointers are stored as shown in FIG. 19. This approach can reduce the average buffer overheads, but requires a faster shared buffer memory since it needs two buffer accesses to transmit a multicast cell.

Finally, it should be noted that the enhance linked-list structure is also useful for fault-tolerance since multiple tags can be used to serve as redundant pointers to the next cell in a queue.

Having above indicated a preferred embodiment of the present invention, it will occur to those skilled in the art that modifications and alternatives can be practiced within the spirit of the invention. It is accordingly intended to define the scope of the invention only as indicated in th following claims.

What is claimed is:

1. A cell-level dynamic slot allocating system for use in a connection-oriented cell switching network having a number of nodes and links between said nodes in which users transmit data cells via establishing connections between nodes through said network, said slot allocating system providing asynchronous transmission during either unallocated or unused cell transmission time slots to provide both a guaranteed transmission bandwidth for each user of said network, and bandwidth sharing amongst the users, comprising:

a node and a number of incoming and outgoing links coupled thereto each of said incoming links having at least one of said connections associated therewith;

means for assigning a fixed synchronous time slot for each connection associated with said node to permit the transmission of cells from said node within time frames having alternating fixed synchronous time slots and variable length asynchronous time slots;

means at said node for transmitting cells associated with one of said connections over said network via one outgoing link within a predetermined fixed synchronous time slot; and, means associated with said one connection for transmitting associated cells over said network via said one outgoing link in an asynchronous time slot, said means for transmitting cells in an asynchronous time slot including means for detecting either unused or unallocated time in synchronous time slot at said one node and for asynchronously transmitting cells over said outgoing link in variable length asynchronous time slot augmented by the time made available by said detected unused or unallocated time.

2. The system of claim 1 wherein said unallocated time is that associated with unused time within a synchronous time slot.

3. The system of claim 1, wherein said asynchronous time slot is augmented to the extent of unused time within a previous synchronous time slot.

4. The system of claim 1, wherein said switching network has an upstream node coupled to a downstream node such that an outgoing link from said upstream node is coupled to an incoming link at said downstream node, each of said nodes having a buffer; and means at said upstream node for interrupting said asynchronous transmission when the buffer at the corresponding downstream node is not empty enough to avoid data loss.

5. The system of claim 4, wherein said upstream switch has a number of input links coupled to the corresponding buffer for loading said buffer with cells of corresponding data in corresponding queues, both of said transmitting means including a transmission scheduler means for sequentially accessing said queues in a round robin fashion to provide for said synchronous and asynchronous transmissions, said scheduler means including means for detecting an empty queue and the amount of unused time within the corresponding synchronous time slot and for augmenting a subsequent asynchronous time slot for the transmission of data by said unused time.

6. The system of claim 5, wherein said scheduler means is coupled to said asynchronous transmission interruption means.

7. The system of claim 6, wherein said downstream switch includes means for generating a digital code indicative of the buffer occupation of the buffer therein and wherein said asynchronous transmission interruption means includes a link from said downstream switch to said upstream switch.

8. In a connection-oriented cell switching network having a number of users, a data transmission system for both providing a guaranteed transmission bandwidth for each user, and bandwidth sharing amongst the users, comprising:

means for assigning each of said users at each node a fixed synchronous time slot for the transmission of data within a time frame having alternating synchronous and asynchronous time slots;

means for generating data for transmission over said network from one of said users;

means coupled to said data generating means for transmitting data associated with said one of said users over said network within a predetermined fixed synchronous time slot; and, means coupled to said data generating means for transmitting data associated with said one of said users over said network in an asynchronous time slot, said switching network having a downstream switch and an upstream switch incorporating said transmitting means and having incoming and outgoing links, one of said outgoing links coupled to said downstream switch, each of said switches having a buffer; and means at said upstream switch for interrupting said asynchronous transmission when the buffer at the corresponding downstream switch is not enough to avoid data loss, said downstream switch including means for generating a digital code indicative of the buffer occupation of the buffer therein, with said asynchronous transmission interruption means including a link from said downstream switch to said upstream switch, said upstream switch having a number of said incoming links coupled to the corresponding buffer thereof for loading said buffer with corresponding data in corresponding queues, said means for interrupting said asynchronous transmission including transmission scheduler means for sequentially accessing said queues in a timed round robin fashion to provide for said synchronous and asynchronous transmissions, said transmission scheduler means including means for detecting an empty queue and the amount of unused time within the corresponding synchronous time slot and for augmenting a subsequent asynchronous time slot for the transmission of data by said unused time.

* * * * *